(12) United States Patent
Nakajima (10) Patent No.: US 12,386,217 B2
(45) Date of Patent: Aug. 12, 2025

(54) LIQUID CRYSTAL PANEL AND ELECTRONIC DEVICE

(71) Applicant: SEIKO EPSON CORPORATION, Tokyo (JP)

(72) Inventor: Osamu Nakajima, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 11 days.

(21) Appl. No.: 18/616,078

(22) Filed: Mar. 25, 2024

(65) Prior Publication Data

US 2024/0329453 A1 Oct. 3, 2024

(30) Foreign Application Priority Data

Mar. 28, 2023 (JP) ................................. 2023-051083

(51) Int. Cl.
*G02F 1/1333* (2006.01)

(52) U.S. Cl.
CPC .. *G02F 1/133354* (2021.01); *G02F 1/133308* (2013.01); *G02F 1/133385* (2013.01); *G02F 2202/28* (2013.01)

(58) Field of Classification Search
CPC ..................................... G02F 1/1333
See application file for complete search history.

(56) References Cited

FOREIGN PATENT DOCUMENTS

| JP | 2002366046 | * 12/2002 | ........... G02F 1/1333 |
|----|------------|-----------|------------------------|
| JP | 2006058605 | 3/2006 | |
| JP | 2006058665 | * 3/2006 | ........... G02F 1/1333 |

* cited by examiner

*Primary Examiner* — Richard H Kim
(74) *Attorney, Agent, or Firm* — JCIPRNET (57) ABSTRACT

A liquid crystal panel includes a counter substrate, a cover glass arranged at the counter substrate with an adhesive therebetween, an element substrate that is arranged at a surface of the counter substrate opposite to a surface at which the cover glass is arranged with a liquid crystal layer therebetween, and a casing member that is bonded to the counter substrate, the cover glass, and the element substrate via another adhesive. The another adhesive is provided on side surfaces of the counter substrate, the cover glass, and the element substrate except for one side of the element substrate. The counter substrate, the cover glass, and the element substrate are arranged in a state in which the side surfaces thereof are substantially aligned in plan view except for the one side.

7 Claims, 6 Drawing Sheets

LIQUID CRYSTAL PANEL AND ELECTRONIC DEVICE

The present application is based on, and claims priority from JP Application Serial Number 2023-051083, filed Mar. 28, 2023, the disclosure of which is hereby incorporated by reference herein in its entirety.

BACKGROUND

1. Technical Field

The present disclosure relates to a liquid crystal panel and an electronic device.

2. Related Art

As is well known, a liquid crystal panel has a configuration in which a liquid crystal is sandwiched between an element substrate and a counter substrate. When such a liquid crystal panel is used as a light valve of a projection-type display apparatus, an image generated by the liquid crystal panel is enlarged and projected. In this case, when dust or the like adheres to the non-opposing surface of the element substrate or the opposing surface, the dust is enlarged and projected, so that the display quality is significantly deteriorated. The non-opposing surface means a surface of the element substrate opposite to the surface facing the counter substrate, or a surface of the counter substrate opposite to the surface facing the element substrate.

Since light of high luminance is incident on the liquid crystal panel, it is necessary to provide a configuration for dissipating heat from the liquid crystal panel.

For this reason, there is known a technique by which a liquid crystal panel having a cover glass bonded to a non-opposing surface of a counter substrate is fitted into and bonded to a casing member to prevent dust on the liquid crystal panel and promote heat dissipation from the liquid crystal panel (for example, see JP-A-2006-58605).

However, with the above-described technique, stress is generated due to contraction of an adhesive for bonding a casing agent, and the substrate of the liquid crystal panel may be deformed by the stress. When the substrate of the liquid crystal panel is deformed, a gap (cell gap) for sealing the liquid crystal becomes non-uniform, so that there is a problem that display quality is remarkably deteriorated.

SUMMARY

In order to solve the above problems, a liquid crystal panel according to one aspect of the present disclosure includes a first substrate, a second substrate arranged at the first substrate with a first adhesive therebetween, a third substrate that faces a surface of the first substrate opposite to a surface facing the first adhesive layer is arranged and that is arranged with a liquid crystal layer therebetween, and a casing member bonded to the first substrate, the second substrate, and the third substrate via a second adhesive, in which the second adhesive is provided on side surfaces of the first substrate, the second substrate, and the third substrate, except for one side of the third substrate, and the first substrate, the second substrate, and the third substrate are arranged in a state in which the side surfaces thereof are substantially aligned in plan view except for the one side of the third substrate.

DESCRIPTION OF EMBODIMENTS

Hereinafter, a liquid crystal panel according to an embodiment will be described with reference to the drawings. In each drawing, dimensions and scales of each part are appropriately made different from actual ones. Embodiments described below are suitable specific examples, and various technically preferable limitations are applied, but the scope of the disclosure is not limited to these embodiments unless they are specifically described in the following description as limiting the disclosure.

Figure 1:
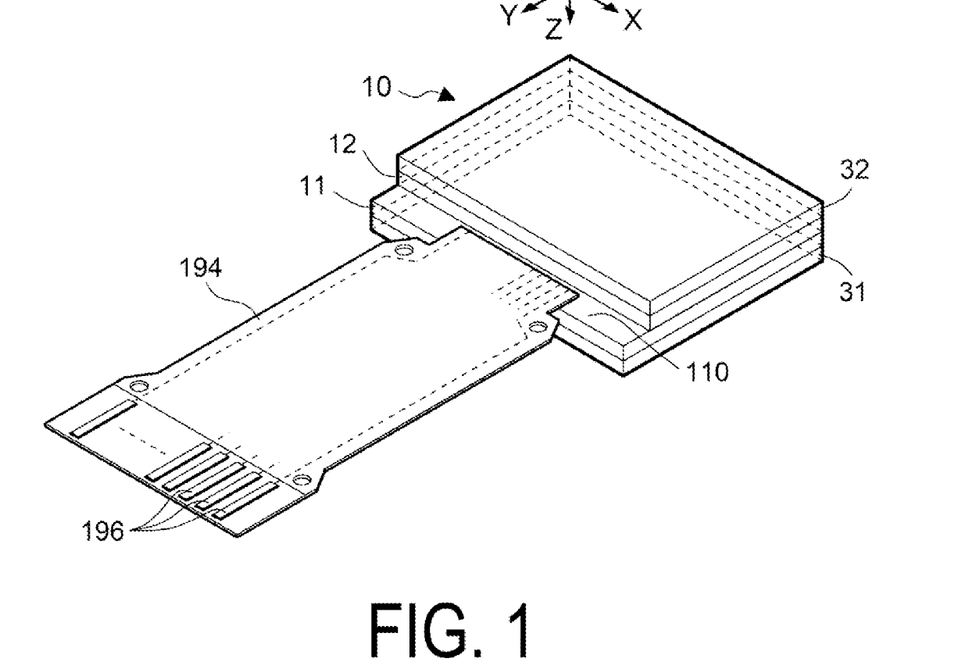
FIG. 1 is a perspective view of a configuration of a liquid crystal panel according to an embodiment.
Figure 2:
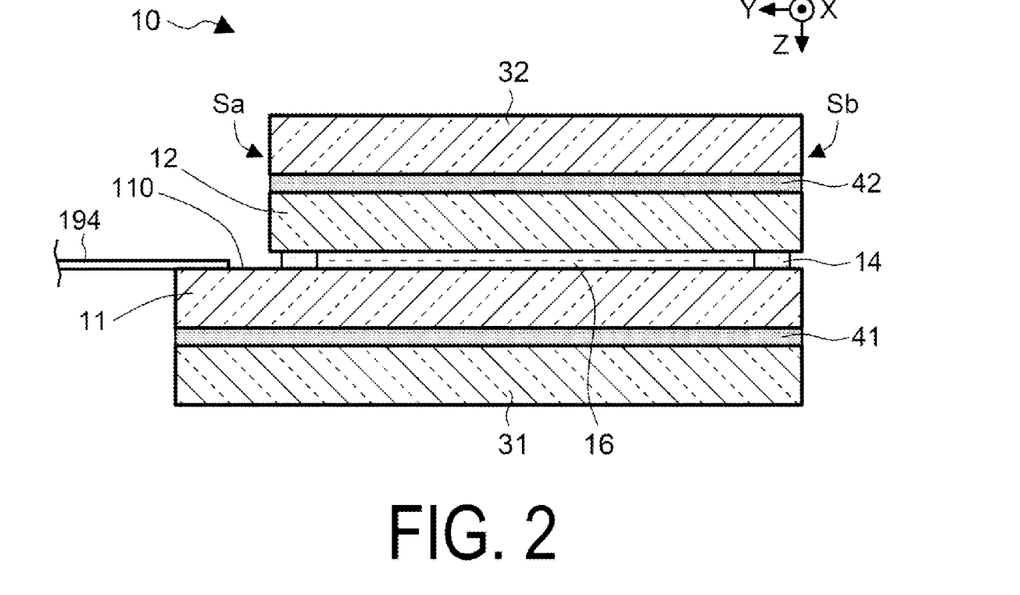
FIG. 2 is a cross-sectional view of a configuration of the liquid crystal panel.

FIG. 1 is a perspective view of a configuration of a liquid crystal panel according to an embodiment, and FIG. 2 is a cross-sectional view of the liquid crystal panel taken along a Y-Z plane in FIG. 1.

As illustrated in FIG. 1, a liquid crystal panel 10 has a configuration in which a cover glass 32, a counter substrate 12, an element substrate 11, and a cover glass 31 are stacked.

The liquid crystal panel 10 is a transmissive type, for example. In the liquid crystal panel 10, as is well known, the element substrate 11 provided with pixel electrodes and the counter substrate 12 provided with a common electrode are bonded to each other with a sealing material 14 such that their electrode formation surfaces face each other with a certain clearance maintained therebetween, and a liquid crystal 16 is sealed in this clearance to constitute a liquid crystal layer.

In addition to the pixel electrodes, scanning lines, data lines, transistors for switching between the data lines and the pixel electrodes, driving circuits for driving the scanning lines and the data lines, and the like are provided on the element substrate 11. However, since these elements are not important, description thereof will be omitted.

In the drawings, the X direction indicates an extending direction of the scanning lines, and generally indicates a long-side direction of a rectangular display region. The Y direction indicates an extending direction of the data lines, and generally indicates a short-side direction of the display region in plan view. The Z direction is a direction perpendicular to the X-Y plane and indicates a direction in which light enters the liquid crystal panel 10. The plan view refers to a view of the liquid crystal panel 10 from the Z direction or from a direction opposite to the Z direction.

As is well known, a polarizing plate (not illustrated) is arranged at the incident side and the emission side of the liquid crystal panel 10, and the transmittance of the liquid crystal element changes according to the voltage applied by the pixel electrodes and the common electrode. Therefore, a display image is generated in the display region in which the pixel electrodes are arranged in plan view.

Each of the element substrate 11 and the counter substrate 12 has a rectangular shape in plan view. The element substrate 11 and the counter substrate 12 are bonded to each other in a state where three sides thereof are aligned in plan view, but one side of the element substrate 11 in the long-side direction protrudes from the counter substrate 12 in the Y direction in plan view. For convenience, a portion of the element substrate 11 that protrudes from the counter substrate 12 will be referred to as a protruding portion 110.

One end of an FPC substrate 194 is coupled to a surface of the protruding portion 110 facing the counter substrate 12. FPC is an abbreviation for flexible printed circuit. The other end of the FPC substrate 194 has a plurality of terminals 196 to be coupled to a host device. When the plurality of terminals 196 is coupled to the host device, a data signal according to the gradation level of the pixels, a control signal for controlling the drive circuit, and the like are supplied from the host device to the liquid crystal panel 10 via the FPC substrate 194.

The cover glass 32 is a dust-proof glass that prevents dust or the like from adhering to the light incident surface of the counter substrate 12, that is, the non-facing surface opposite to the surface of the counter substrate 12 facing the element substrate 11. The sizes of the cover glass 32 in the X direction and the Y direction are substantially the same as the sizes of the counter substrate 12 in the X direction and the Y direction in this order. The cover glass 32 is bonded to the incident surface of the counter substrate 12 with an adhesive 42 in a state where the sides of the counter substrate 12 are aligned in plan view. Accordingly, the counter substrate 12 and the cover glass 32 are arranged in a state where the side surfaces thereof are substantially aligned with each other in plan view.

The cover glass 31 is a dust-proof glass that prevents dust or the like from adhering to the light emission surface of the element substrate 11, that is, the non-facing surface opposite to the surface of the element substrate 11 facing the counter substrate 12. The sizes of the cover glass 31 in the X direction and the Y direction are substantially the same as the sizes of the element substrate 11 in the X direction and the Y direction in this order. The cover glass 31 is bonded to the emission surface of the element substrate 11 with an adhesive 41 in a state where the sides of the element substrate 11 are substantially aligned in plan view. Accordingly, the element substrate 11 and the cover glass 31 are arranged in a state where the side surfaces thereof are substantially aligned with each other in plan view.

Figure 3:
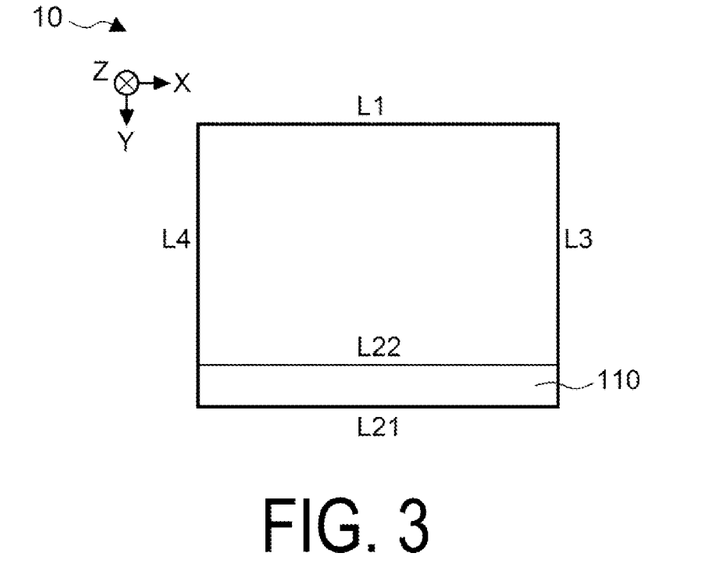
FIG. 3 is a plan view of a configuration of the liquid crystal panel.

FIG. 3 is a plan view of a configuration of the liquid crystal panel 10.

In plan view of the liquid crystal panel 10, for the sake of convenience, among the four sides of the element substrate 11 and the counter substrate 12, a side facing the protruding portion 110 in the long-side direction will be referred to as L1. In addition, a side opposite to the side L1 and defined by the element substrate 11 and the cover glass 31 will be referred to as L21, and a side opposite to the side L1 and defined by the counter substrate 12 and the cover glass 32 will be referred to as L22. Among the four sides of the element substrate 11 and the counter substrate 12, a side in the X direction in the short-side direction will be referred to as L3, and a side facing the side 13 will be referred to as L4.

In the liquid crystal panel 10, at the sides L1, L3, and L4, the side surfaces of the element substrate 11, the counter substrate 12, and the cover glasses 31 and 32 are substantially aligned except for the protruding portion 110. In the liquid crystal panel 10, the side surfaces of the element substrate 11 and the cover glass 31 are substantially aligned with each other at the side L21, and the side surfaces of the counter substrate 12 and the cover glass 32 are substantially aligned with each other at the side L22.

The liquid crystal panel 10 is actually combined with optical members such as a light source and a lens in a state of being attached to a casing member. The liquid crystal panel 10 is bonded to the casing member with an adhesive.

Figure 4:
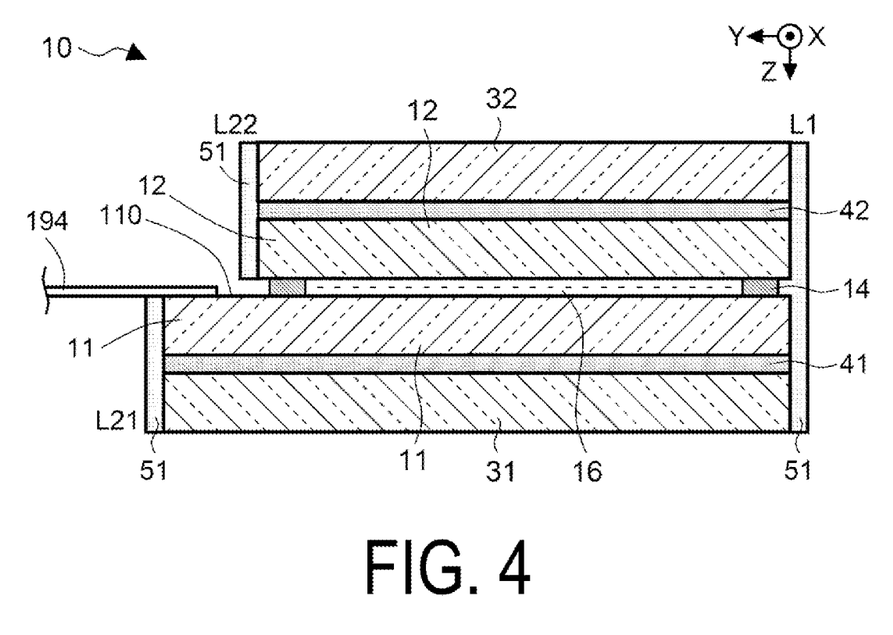
FIG. 4 is a diagram illustrating an application position of an adhesive to the liquid crystal panel.

FIG. 4 is a diagram for describing application of an adhesive for bonding the liquid crystal panel 10 to the casing member.

The adhesive 51 for bonding the liquid crystal panel 10 to the casing member is applied at the side L1 to the side surfaces of the cover glass 32, the counter substrate 12, the element substrate 11, and the cover glass 31 by a dispenser or the like. The adhesive 51 is applied at the side L22 to the side surfaces of the cover glass 32 and the counter substrate 12, and is applied at the side L21 to the side surfaces of the element substrate 11 and the cover glass 31.

As the adhesive 51, an epoxy resin adhesive, an ultraviolet curing adhesive, or the like is used, for example. The adhesive 51 is not applied to the protruding portion 110 as described below because there is a step between the element substrate 11 and the counter substrate 12 in a cross-sectional view.

Figure 5:
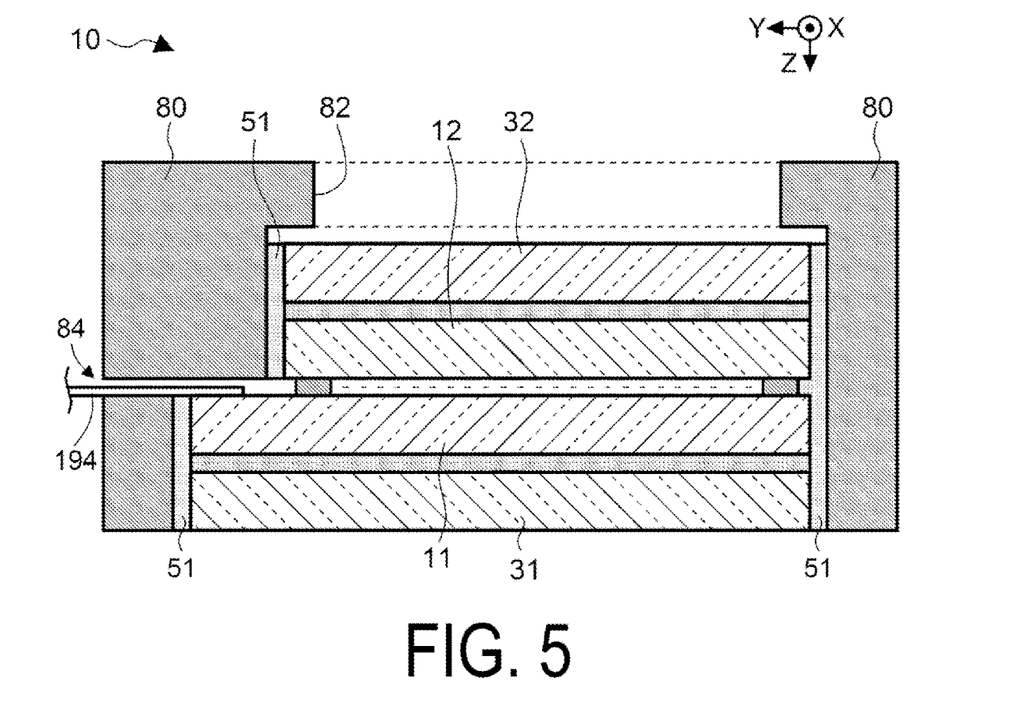
FIG. 5 is a diagram illustrating a state in which the liquid crystal panel is bonded to a casing member.

FIG. 5 is a diagram illustrating a state in which the liquid crystal panel 10 is attached to a casing member 80 by the adhesive 51. In the drawing, reference numeral 82 denotes an opening in the display region of the liquid crystal panel 10. Light from the light source enters the liquid crystal panel 10 through the opening 82. The casing member 80 is provided with a slit 84 through which the FPC substrate 194 passes. The casing member 80 is made of metal such as aluminum, for example, in order to enhance heat dissipation of the liquid crystal panel 10.

Figure 6:
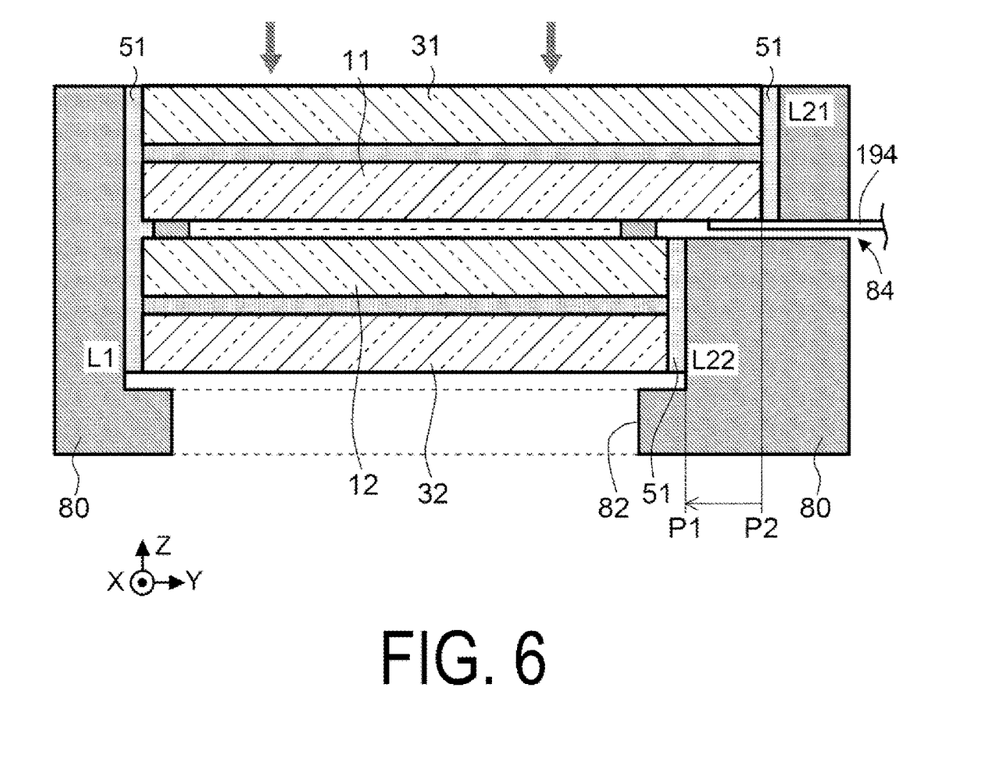
FIG. 6 is a diagram illustrating a situation in which the liquid crystal panel is being bonded to the casing member.

The liquid crystal panel 10 to which the adhesive 51 is applied is actually inserted into the casing member 80, vertically inverted from the state in FIG. 4, specifically, with the cover glass 32 in the lead as indicated by arrows in FIG. 6, and is bonded to the casing member 80.

In inserting the liquid crystal panel 10 into the casing member 80, it is necessary to consider dripping of the adhesive 51 applied to the side surfaces of the element substrate 11 and the cover glass 31 at the side L21. Therefore, a position P1 of the end surface of the casing member 80 facing the side surfaces of the cover glass 32 and the counter substrate 12 at the side L21 is located at the left side in FIG. 6, that is, at the display region side with respect to the position P2 of the side surfaces of the element substrate 11 and the cover glass 31 at the side L22. Accordingly, even when the adhesive 51 applied to the side surfaces of the element substrate 11 and the cover glass 31 drips at the side L22 drips, the drips of the adhesive 51 are received by the casing member 80, so that contamination of the periphery is prevented.

It is preferable that the counter substrate 12 and the cover glass 31 are bonded to each other in a state where four sides thereof are aligned in plan view. However, the casing member 80 and the liquid crystal panel 10 are designed so that the counter substrate 12 and the cover glass 31 can be bonded to the casing member 80 with the adhesive 51 as long as the misalignment between the counter substrate 12 and the cover glass 31 is within 0.5 mm in plan view.

Figure 7:
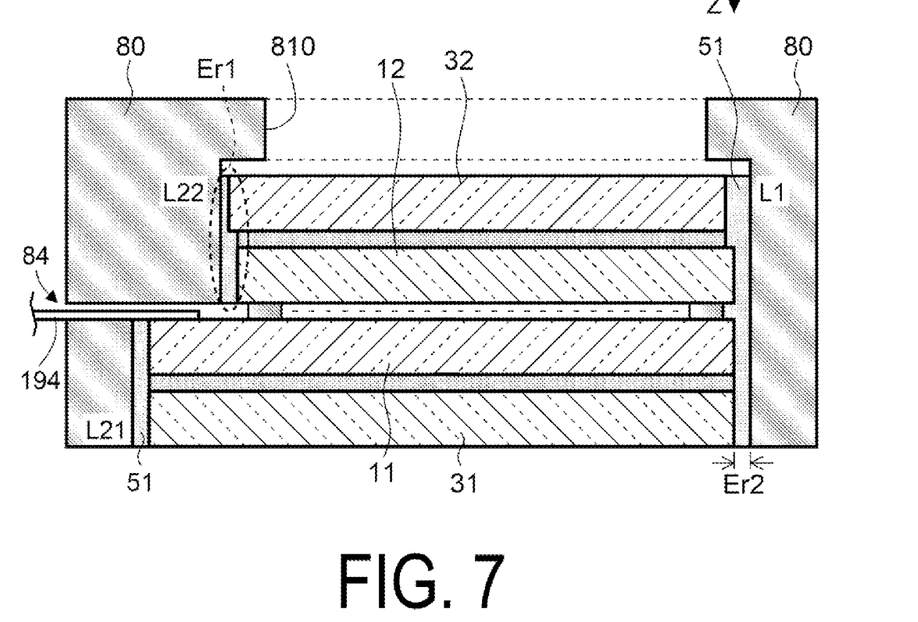
FIG. 7 is a diagram illustrating a misalignment during casing of the liquid crystal panel.

For example, as illustrated in FIG. 7, even when the counter substrate 12 and the cover glass 31 are misaligned as indicated by a broken line Er1 at the side L22 (side L1), the liquid crystal panel 10 can be bonded to the casing member 80 with the adhesive 51 as long as the misalignment is within 0.5 mm.

The casing member 80 and the liquid crystal panel 10 are designed so that, in the case of positioning the liquid crystal panel 10 for bonding to the casing member 80 using the counter substrate 12, the counter substrate 12 and the cover glass 31 can be bonded to the casing member 80 by the adhesive 51 as long as the misalignment between the counter substrate 12 and the casing member 80 is within 0.5 mm in plan view.

For example, as illustrated in FIG. 7, even when the counter substrate 12 and the casing member 80 are misaligned as indicated by a broken line Er2 at the side L1 (side L21), the liquid crystal panel 10 can be bonded to the casing member 80 with the adhesive 51 as long as the misalignment is within 0.5 mm.

Before description of the superiority of the liquid crystal panel 10 according to the embodiment, a comparative example to the embodiment will be described.

Figure 9:
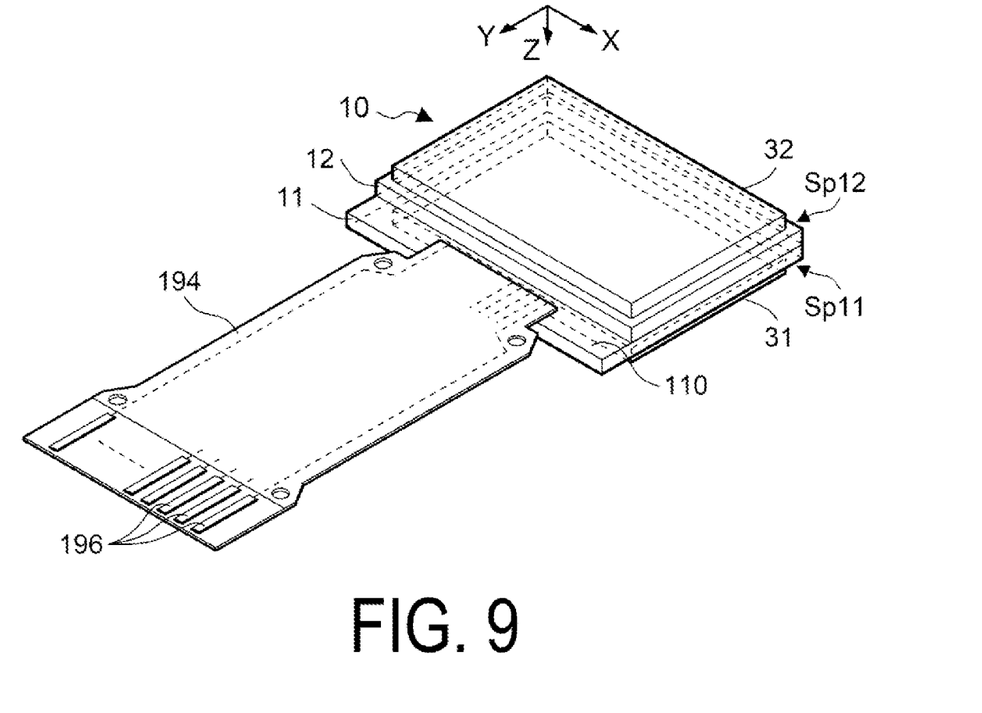
FIG. 9 is a perspective view of a configuration of a liquid crystal panel according to a comparative example.
Figure 10:
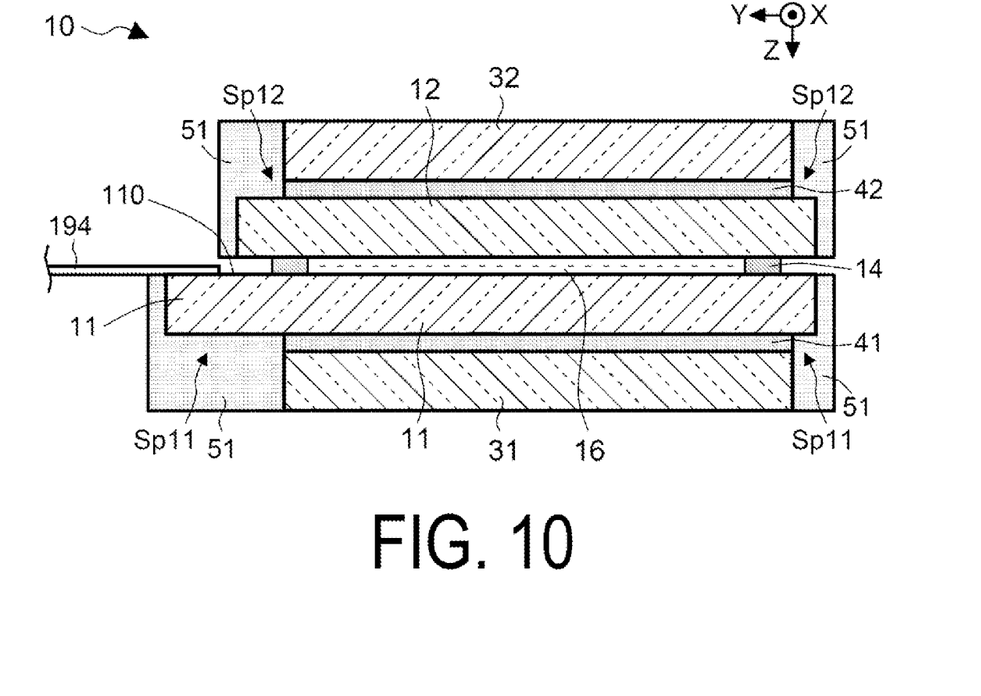
FIG. 10 is a diagram illustrating an application position of an adhesive to the liquid crystal panel according to the comparative example.

FIG. 9 is a perspective view of a configuration of a liquid crystal panel according to the comparative example, and FIG. 10 is a cross-sectional view of the liquid crystal panel taken along a Y-Z plane in FIG. 9.

As illustrated in these drawings, the liquid crystal panel 10 according to the comparative example has a configuration in which an element substrate 11, a counter substrate 12, and cover glasses 31 and 32 are stacked, as in the embodiment. However, in the comparative example, the cover glass 32 is slightly smaller than the counter substrate 12 in plan view. Therefore, there is a step Sp12 between the counter substrate 12 and the cover glass 32 in a cross-sectional view. In the comparative example, the cover glass 31 is slightly smaller than the counter substrate 12 in plan view. Therefore, there is a step Sp11 between the element substrate 11 and the cover glass 31 in a cross-sectional view.

An adhesive 51 for bonding the liquid crystal panel 10 according to the comparative example to a casing member is applied to the side surfaces of the cover glass 32 and the counter substrate 12 including the step Sp12. In the comparative example, the adhesive 51 is applied to the side surfaces of the cover glass 31 and the element substrate 11 including the step Sp11. Thereafter, although not illustrated, the liquid crystal panel 10 is bonded to a casing member 80.

However, in the comparative example, the substrate becomes distorted due to contraction stress caused by curing of the adhesive 51. This point will be described by taking the cover glass 32, the counter substrate 12, and the element substrate 11 as examples.

Figure 11:
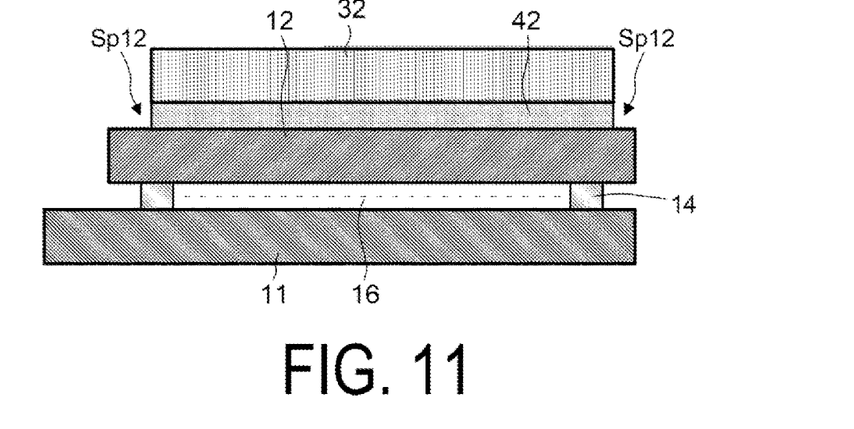
FIG. 11 is a diagram simply illustrating a defect in the liquid crystal panel according to the comparative example.
Figure 12:
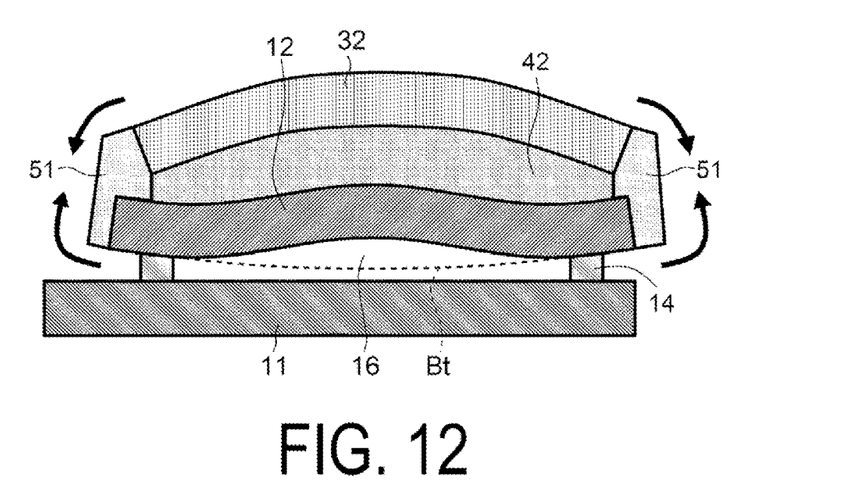
FIG. 12 is a diagram simply illustrating a defect in the liquid crystal panel according to the comparative example.
Figure 13:
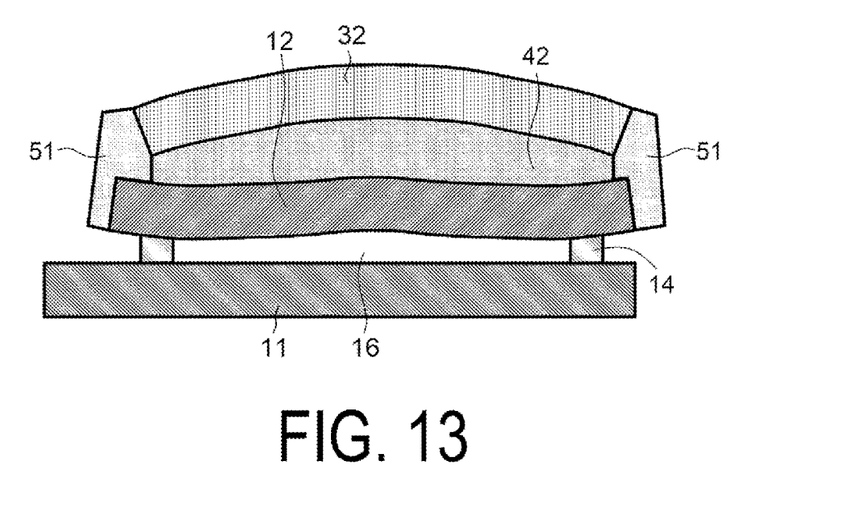
FIG. 13 is a diagram simply illustrating a defect in the liquid crystal panel according to the comparative example.

FIGS. 11 to 13 are simplified cross-sectional views of the cover glass 32, the counter substrate 12, and the element substrate 11 with different hatchings for easy understanding of their distortions.

FIG. 11 illustrates a state before application of the adhesive 51, where no distortion occurs in the cover glass 32, the counter substrate 12, and the element substrate 11.

In this state, as illustrated in FIG. 10, the adhesive 51 is applied to the side surfaces of the cover glass 32 and the counter substrate 12 including the step Sp12.

FIG. 12 illustrates a state where the adhesive 51 is contracted. Stress as indicated by arrows in the drawing is applied to the cover glass 32 and the counter substrate 12 due to contraction of the adhesive 51 during curing.

Specifically, the counter substrate 12 tends to deform as indicated by a broken line Bt with the sealing material 14 as a fulcrum due to the contraction stress of the adhesive 51. However, the volume of a liquid crystal 16 sealed in the gap between the element substrate 11 and the liquid crystal 16 cannot be changed and is kept constant. Therefore, the outer peripheral portion of the counter substrate 12 becomes deformed upward in the drawing due to the contraction stress of the adhesive 51, and the central portion of the liquid crystal layer in which the liquid crystal 16 is sealed becomes deformed and convexed upward. Therefore, the counter substrate 12 becomes deformed with undulations as illustrated in the drawing.

The outer peripheral portion of the cover glass 32 is pulled downward in the drawing due to the contraction stress of the adhesive 51. Therefore, the central portion of the cover glass 32 becomes curved upward.

FIG. 13 illustrates a state in which a certain period of time has elapsed after contraction of the adhesive 51. The elastic moduli of the counter substrate 12 and the element substrate 20 are much higher than the elastic modulus of the adhesive 51. Therefore, since the counter substrate 12 and the cover glass 31 subjected to the contraction stress of the adhesive 51 are displaced in the direction of releasing the stress, the degree of distortions of the counter substrate 12 and the cover glass 31 is reduced, but the counter substrate 12 and the cover glass 31 do not completely return to the original states.

The distortions of the cover glass 32 and the counter substrate 12 have been described here. However, since the adhesive 51 is applied to the side surfaces of the cover glass 31 and the element substrate 11 including the step Sp11, the cover glass 31 and the element substrate 11 undergo similar distortions.

As described above, in the comparative example, since the counter substrate 12 and the element substrate 11 become distorted due to the contraction stress of the adhesive 51 at the steps Sp11 and Sp12, the gap between the substrates is not constant and the display quality of the liquid crystal panel 10 is degraded.

When the adhesive 51 is applied so as to avoid the steps Sp11 and Sp12, the amount of the adhesive 51 is reduced accordingly, and the adhesion capability of the casing member 80 is deteriorated, so that the misalignment between the casing member 80 and the liquid crystal panel 10 tends to be a problem.

On the other hand, in the present embodiment, the steps Sp11 and Sp12 as in the comparative example are not provided, that is, the adhesive 51 is applied to the side surfaces of the cover glass 32 and the counter substrate 12 and to the side surfaces of the cover glass 31 and the element substrate 11, in a state where these side surfaces are substantially aligned.

For this reason, the contraction stress of the adhesive 51 is generated substantially in the Z direction or the opposite direction, and is hardly generated in the direction in which the substrate is warped. Therefore, in the present embodiment, since the gap between the counter substrate 12 and the element substrate 11 is kept constant, it is possible to suppress a decrease in the display quality of the liquid crystal panel 10.

The state in which the side surfaces of two or more substrates are substantially aligned with each other means that a misalignment within 0.5 mm is permitted as described above, or means that a slight misalignment to such an extent that the contraction stress of the adhesive 51 does not affect the substrates is permitted.

The counter substrate 12 is an example of a first substrate, and the cover glass 32 is an example of a second substrate. The element substrate 13 is an example of a third substrate, and the cover glass 31 is an example of a fourth substrate.

The adhesive 42 is an example of a first adhesive, the adhesive 51 is an example of a second adhesive, and the adhesive 41 is an example of a third adhesive. The side L21 is an example of one side of the third substrate.

Next, a projection-type display apparatus will be described as an example of an electronic device to which the liquid crystal panel 10 according to the embodiment is applied.

Figure 8:
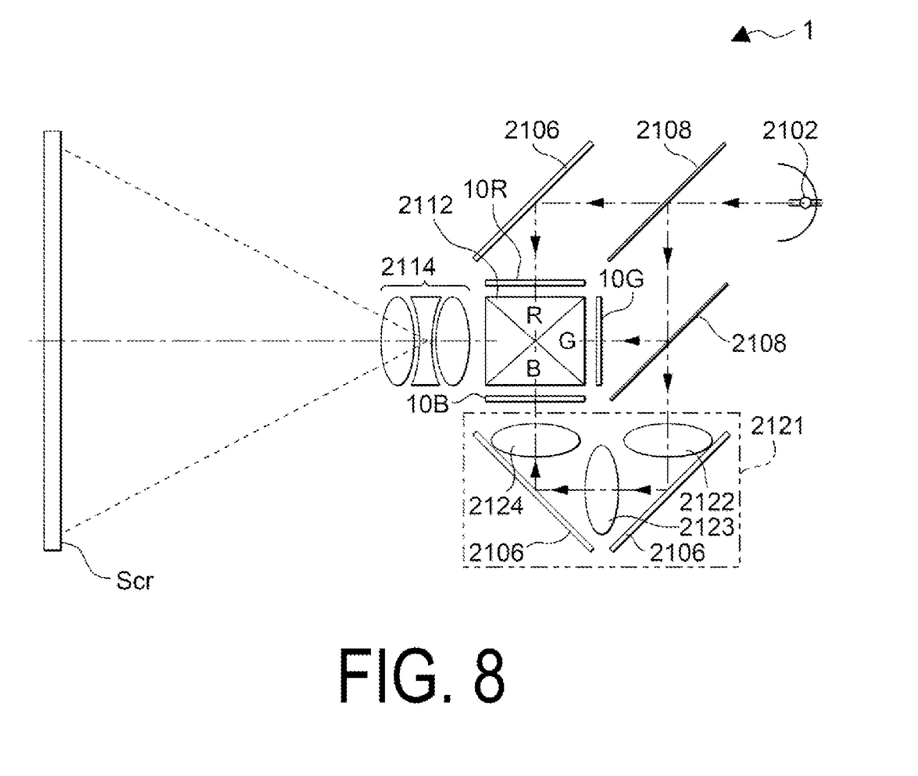
FIG. 8 is a diagram illustrating a projection-type display apparatus to which the liquid crystal panel is applied.

FIG. 8 is a diagram illustrating an optical configuration of the projection-type display apparatus 1. As illustrated in the drawing, the projection-type display apparatus 1 includes liquid crystal panels 10R, 10G, and 10B.

The projection-type display apparatus 1 contains a lamp unit 2102 including a white light source such as a halogen lamp. Projection light emitted from the lamp unit 2102 is split into three primary colors of red (R), green (G), and blue (B) by three mirrors 2106 and two dichroic mirrors 2108 arranged in the projection-type display apparatus 1. Of the light of the primary colors, light of R, light of G, and light of B are incident on the liquid crystal panel 10R, the liquid crystal panel 10G, and the liquid crystal panel 10B, respectively.

Since an optical path of B is longer than optical paths of R and G, it is necessary to prevent a loss in the optical path of B. Thus, a relay lens system 2121 including an incidence lens 2122, a relay lens 2123, and an emission lens 2124 is provided in the optical path of B.

The liquid crystal panels 10R, 10G, and 10B are of the same type as the liquid crystal panel 10 according to the embodiment, but they are different in the color of incident light and are distinguished by reference numerals for convenience.

The liquid crystal element of the liquid crystal panel 10R is driven based on a data signal corresponding to R supplied from the host apparatus and has a transmittance corresponding to the voltage of the data signal.

Thus, in the liquid crystal panel 10R, a transmitted image of R is generated by individually controlling the transmittance of the liquid crystal element. Similarly, in the liquid crystal panel 10G, a transmitted image of G is generated based on a data signal corresponding to G, and in the liquid crystal panel 10B, a transmitted image of B is generated based on a data-signal corresponding to B.

The transmitted color images generated by the corresponding liquid crystal panels 10R, 10G, and 10B enter a dichroic prism 2112 from three directions. At the dichroic prism 2112, the light of R and the light of B are refracted at 90 degrees, whereas the light of G travels in a straight line. Thus, the dichroic prism 2112 combines the color images. The image combined by the dichroic prism 2112 enters a projection lens 2114. The projection lens 2114 enlarges and projects the combined image onto a screen Scr.

While the transmitted images by the liquid crystal panels 10R and 10B are projected after being reflected by the dichroic prism 2112, the transmitted image by the liquid crystal panel 10G travels in a straight line and is projected. Thus, the respective transmitted images of the liquid crystal panels 10R and 10B are laterally inverted with respect to the transmitted image of the liquid crystal panel 10G.

The projection-type display apparatus 1 has been exemplified here as the electronic device. However, the present disclosure is not limited to the projection-type display apparatus 1. For example, the present disclosure can also be applied to a display panel of a head mounted display, an electronic viewfinder in a video camera, a lens-interchangeable digital camera, or the like, a display unit of a portable information terminal, a wristwatch, or the like.

For example, the following aspects of the present disclosure are understood from the embodiments illustrated above.

A liquid crystal panel according to one aspect (first aspect) includes a first substrate, a second substrate arranged at the first substrate with a first adhesive therebetween, a third substrate that faces a surface of the first substrate opposite to a surface at which the first adhesive is arranged and that is arranged with a liquid crystal layer therebetween, and a casing member bonded to the first substrate, the second substrate, and the third substrate via a second adhesive, in which the second adhesive is provided on side surfaces of the first substrate, the second substrate, and the third substrate, except for one side of the third substrate, and the first substrate, the second substrate, and the third substrate are arranged in a state in which the side surfaces thereof are substantially aligned in plan view except for the one side of the third substrate.

According to the first aspect, deformation of the substrates of the liquid crystal panel is suppressed, so that deterioration of display quality can be suppressed.

In a specific aspect (second aspect) of the first aspect, the one side of the third substrate is a protruding portion that protrudes beyond the first substrate and the second substrate.

In a more specific aspect (third aspect) of the second aspect, one end of an FPC substrate is coupled to the protruding portion.

A specific aspect (fourth aspect) of the first aspect further includes a fourth substrate that faces a surface of the third substrate at a side opposite to the liquid crystal layer and is arranged via a third adhesive, in which the third substrate and the fourth substrate are arranged in a state in which side surfaces thereof are substantially aligned in plan view.

In a specific aspect (fifth aspect) of the first aspect, the second adhesive bonds the side surfaces of the first substrate and the second substrate and the casing member, where a misalignment between the first substrate and the second substrate is within 0.5 mm in plan view.

In a specific aspect (sixth aspect) of the first aspect, the second adhesive bonds the side surfaces of the first substrate and the second substrate and the casing member, where a misalignment between the first substrate and the second substrate is within 0.5 mm in plan view.

An electronic device according to a seventh aspect includes the liquid crystal panel according to any one of the first to sixth aspects. According to the seventh aspect, it is possible to suppress deterioration in the display quality of the liquid crystal panel.

What is claimed is:

1. A liquid crystal panel comprising:
 a first substrate;
 a second substrate arranged at the first substrate with a first adhesive therebetween;
 a third substrate that faces a surface of the first substrate opposite to a surface at which the first adhesive is arranged and that is arranged with a liquid crystal layer therebetween; and
 a casing member bonded to the first substrate, the second substrate, and the third substrate via a second adhesive, wherein the second adhesive is provided at side surfaces of the first substrate, the second substrate, and the third substrate, except for one side of the third substrate, and the first substrate, the second substrate, and the third substrate are arranged in a state in which the side surfaces thereof are substantially aligned in plan view except for the one side of the third substrate.

2. The liquid crystal panel according to claim 1, wherein the one side of the third substrate is a protruding portion that protrudes beyond the first substrate and the second substrate.

3. The liquid crystal panel according to claim 2, wherein one end of an FPC substrate is coupled to the protruding portion.

4. The liquid crystal panel according to claim 1, further comprising a fourth substrate that faces a surface of the third substrate at a side opposite to the liquid crystal layer and is arranged via a third adhesive, wherein the third substrate and the fourth substrate are arranged in a state in which side surfaces thereof are substantially aligned in plan view.

5. The liquid crystal panel according to claim 1, wherein the second adhesive bonds the side surfaces of the first substrate and the second substrate and the casing member, where a misalignment between the first substrate and the second substrate is within 0.5 mm in plan view.

6. The liquid crystal panel according to claim 1, wherein the second adhesive bonds the side surfaces of the first substrate and the second substrate and the casing member, where a misalignment between the first substrate and the casing member is within 0.5 mm in plan view.

7. An electronic device comprising the liquid crystal panel according to claim 1.

* * * * *